United States Patent
Tsai et al.

(10) Patent No.: US 12,045,992 B2
(45) Date of Patent: Jul. 23, 2024

(54) MULTI-DOMAIN SEMANTIC SEGMENTATION WITH LABEL SHIFTS

(71) Applicant: NEC Laboratories America, Inc., Princeton, NJ (US)

(72) Inventors: Yi-Hsuan Tsai, Santa Clara, CA (US); Masoud Faraki, San Jose, CA (US); Yumin Suh, Santa Clara, CA (US); Sparsh Garg, San Jose, CA (US); Manmohan Chandraker, Santa Clara, CA (US); Dongwan Kim, Seoul (KR)

(73) Assignee: NEC Corporation, Tokyo (JP)

( * ) Notice: Subject to any disclaimer, the term of this patent is extended or adjusted under 35 U.S.C. 154(b) by 392 days.

(21) Appl. No.: 17/520,207

(22) Filed: Nov. 5, 2021

(65) Prior Publication Data

US 2022/0148189 A1 May 12, 2022

Related U.S. Application Data

(60) Provisional application No. 63/114,080, filed on Nov. 16, 2020, provisional application No. 63/111,864, filed on Nov. 10, 2020.

(51) Int. Cl.
| | |
|---|---|
| G06K 9/00 | (2022.01) |
| G06F 18/214 | (2023.01) |
| G06F 18/2415 | (2023.01) |
| G06F 18/2431 | (2023.01) |
| G06T 7/11 | (2017.01) |

(52) U.S. Cl.
CPC ............ *G06T 7/11* (2017.01); *G06F 18/2148* (2023.01); *G06F 18/2415* (2023.01); *G06F 18/2431* (2023.01); *G06T 2207/20081* (2013.01); *G06T 2207/20084* (2013.01)

(58) Field of Classification Search
CPC ............ G06T 7/11; G06T 2207/20081; G06T 2207/20084; G06T 7/73; G06F 18/2148; G06F 18/2415; G06F 18/2431; G06V 10/82
See application file for complete search history.

(56) References Cited

U.S. PATENT DOCUMENTS

| | | | | |
|---|---|---|---|---|
| 10,692,002 B1 | * | 6/2020 | Kim | ............... G06F 18/214 |
| 11,164,045 B2 | * | 11/2021 | Paik | ............... G16H 15/00 |

(Continued)

FOREIGN PATENT DOCUMENTS

| | | | | |
|---|---|---|---|---|
| CN | 111369615 A | * | 7/2002 | ........... G06N 3/0454 |
| CN | 108346145 A | * | 7/2018 | ........... G06N 3/0454 |

(Continued)

OTHER PUBLICATIONS

Lambert, John, et al. "MSeg: A composite dataset for multi-domain semantic segmentation", InProceedings of the IEEE/CVF Conference on Computer Vision and Pattern Recognition. Jun. 2020, pp. 2879-2888.

*Primary Examiner* — Shervin K Nakhjavan
(74) *Attorney, Agent, or Firm* — Joseph Kolodka

(57) ABSTRACT

Methods and systems for training a model include combining data from multiple datasets, the datasets having different respective label spaces. Relationships between labels in the different label spaces are identified. A unified neural network model is trained, using the combined data and the identified relationships to generate a unified model, with a class relational binary cross-entropy loss.

18 Claims, 7 Drawing Sheets

(56) References Cited

U.S. PATENT DOCUMENTS

| | | | |
|---|---|---|---|
| 11,176,417 B2* | 11/2021 | Aides | G06V 10/764 |
| 11,475,280 B2* | 10/2022 | Riemenschneider | |
| | | | G06V 10/776 |
| 11,507,777 B2* | 11/2022 | Amirghodsi | G06F 18/22 |
| 11,544,869 B2* | 1/2023 | Ayvaci | G06V 10/82 |
| 11,593,945 B2* | 2/2023 | Heisler | G06N 3/08 |
| 2019/0005358 A1* | 1/2019 | Pisoni | G06V 10/82 |
| 2019/0050994 A1* | 2/2019 | Fukagai | G06F 18/24 |
| 2019/0147320 A1* | 5/2019 | Mattyus | G06V 20/182 |
| | | | 382/155 |
| 2019/0286921 A1* | 9/2019 | Liang | G06F 16/909 |
| 2019/0325259 A1* | 10/2019 | Murphy | G06F 18/2148 |
| 2020/0134427 A1* | 4/2020 | Oh | G06N 3/084 |
| 2020/0160048 A1* | 5/2020 | Wang | G06N 3/045 |
| 2020/0349362 A1* | 11/2020 | Maloney | G06N 3/084 |
| 2020/0380252 A1* | 12/2020 | Ding | G06T 7/292 |
| 2020/0410224 A1* | 12/2020 | Goel | G06V 40/10 |
| 2021/0027103 A1* | 1/2021 | Brower | G06F 18/2148 |
| 2021/0327055 A1* | 10/2021 | Putha | G06V 10/774 |
| 2022/0083807 A1* | 3/2022 | Zhang | G06T 11/60 |
| 2022/0101112 A1* | 3/2022 | Brown | G10L 15/18 |
| 2022/0148189 A1* | 5/2022 | Tsai | G06F 18/2148 |
| 2022/0277038 A1* | 9/2022 | Li | G06V 10/454 |
| 2022/0327815 A1* | 10/2022 | Picon Ruiz | G06T 7/001 |

FOREIGN PATENT DOCUMENTS

| | | | | |
|---|---|---|---|---|
| CN | 110619632 A | * | 12/2019 | G06K 9/6267 |
| CN | 114072853 A | * | 2/2022 | G06K 9/00657 |
| CN | 111582332 B | * | 5/2022 | G06K 9/6256 |
| CN | 111401281 B | * | 6/2022 | G06K 9/00369 |
| CN | 110969191 B | * | 10/2022 | G06K 9/6277 |
| EP | 3620957 A1 | * | 3/2020 | G06F 18/213 |

* cited by examiner

MULTI-DOMAIN SEMANTIC SEGMENTATION WITH LABEL SHIFTS

This application claims priority to U.S. Provisional Patent Application No. 63/111,864, filed on Nov. 10, 2020, and to U.S. Provisional Patent Application No. 63/114,080, filed on Nov. 16, 2020, incorporated herein by reference in their entirety.

BACKGROUND

Technical Field

The present invention relates to semantic segmentation of images, and, more particularly, to unifying segmentation training datasets.

Description of the Related Art

Semantic segmentation datasets exist for a wide variety of different specific applications. Using a large amount of training data leads to highly effective model training. However, most training methods exploit labels only within a single dataset for training.

SUMMARY

A method for training a model includes combining data from multiple datasets, the datasets having different respective label spaces. Relationships between labels in the different label spaces are identified. A unified neural network model is trained, using the combined data and the identified relationships to generate a unified model, with a class relational binary cross-entropy loss.

A method for training a model includes combining data from multiple datasets of images, the datasets having different respective label spaces that relate to different classes of objects within the images. Relationships between labels in the different label spaces are identified, including hierarchical and synonym relationships, based on a cosine similarity. A unified image segmentation neural network model is trained, using the combined data and the identified relationships to generate a unified model, with a class relational binary cross-entropy loss.

A system for training a hardware processor includes a hardware processor a memory that stores a computer program product. When executed by the hardware processor, the computer program product causes the hardware processor to combine data from multiple datasets, the datasets having different respective label spaces, to identify relationships between labels in the different label spaces, and to train a unified neural network model, using the combined data and the identified relationships to generate a unified model, with a class relational binary cross-entropy loss.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Training data from disparate datasets may be combined to improve training efficacy. To address the fact that different datasets may be labeled differently, a revisited binary cross-entropy loss may be used to compute individual gradients for each class, which resolves a potential gradient conflict that could otherwise arise from conflicting labels in a unified label space, selectively ignoring certain classes during loss computation. This modification to the determination of loss benefits multi-dataset training, particularly on unseen datasets.

Additionally, a class-relational binary cross-entropy loss can provide more connections across label spaces from different datasets. For example, the exemplary classes "bicyclist" and "rider" from different datasets have similar semantic meanings and may be linked together, thereby improving the model trained from the combined dataset. A cosine loss function may be used to implicitly infer class relationships across datasets, without any prior information about these relationships. Multi-class labels may then be generated to appropriately link categories across datasets, and the multi-class labels may be integrated into the revisited binary cross-entropy loss.

Figure 1:
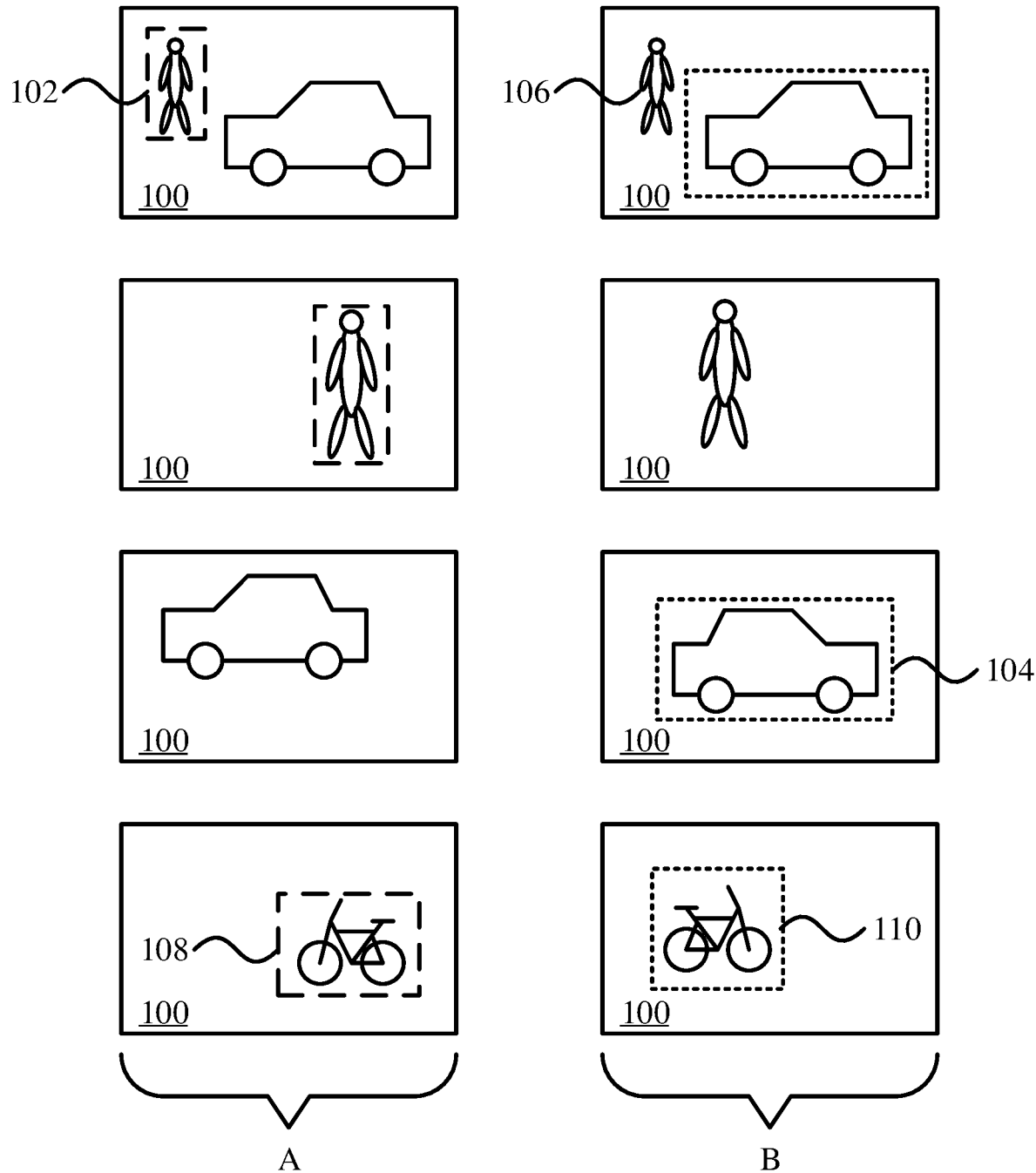
FIG. 1 is a diagram comparing label annotations in different training datasets that are annotated with different associated label spaces, in accordance with an embodiment of a present invention.

Referring now in detail to the figures in which like numerals represent the same or similar elements and initially to FIG. 1, two training datasets are shown. A first dataset, labeled A, is annotated with people, while the second dataset, labeled B, is annotated with automobiles. Each dataset includes multiple images 100, each of which may include zero, one, or more objects of the relevant class.

For example, dataset A indicates the presence of a person with a bounding box 102. Dataset B indicates the presence of an automobile with a bounding box 104. However, each dataset includes images 100 that have objects from the other dataset's class. Thus, for example, images 100 from dataset B may include people 106 who are not annotated with a bounding box. If the images 100 from dataset B are included in a training dataset for a classifier that identifies people, there may be at least some images 100 in the combined dataset which include people as part of the background of the image. This produces inconsistent training data, where some objects are annotated and some are not. Furthermore, in some cases there may be conflicting labels for the datasets. For example, dataset A may use a first label 108 for bicycles, while dataset B may use a second label 110 for bicycles.

In addition to label diversity between datasets, the datasets may have been obtained under diverse conditions. For example, a given type of object (e.g., a truck) may have a different appearance in one part of the world as compared to how that object appears in another part of the world. Even without such cultural and design variations, certain objects are similar to one another in appearance, such as roads and sidewalks.

Since each dataset has its own label space, these label spaces may be unified to combine the datasets for use in training. Given an image $X_i \in \mathbb{R}^{H \times W \times 3}$ in dataset $D_i$, and associated $K_i$-categorical one-hot labels $Y_i \in \{0,1\}^{H \times W \times K_i}$ in the label space $\mathbb{Y}_i$, the label space may be unified as $\mathbb{Y}_u = \mathbb{Y}_1 \cup \mathbb{Y}_2 \cup \ldots \cup \mathbb{Y}_N$, where N is the number of datasets and H and W are image dimensions. This provides labels for each pixel of the image $X_i$. The original labels $Y_i$ for the image are extended to $K_u$ categories, where $K_u \leq \Sigma_i K_i$ is the number of unified categories. Without any prior knowledge, $Y_i$ can be extend to a $K_u$-categorical label by assigning all categories in $\mathbb{Y} = \mathbb{Y}_u \setminus \mathbb{Y}_i$ with a label of zero. A cross-entropy loss that optimizes the segmentation network G on multiple datasets may be written as:

$$\mathcal{L}_{seg}^{ce} = -\sum_{i=1}^{N} \sum_{k=1}^{K_u} \sum_{h,w} Y_i^{h,w,k} \log(P_i^{(h,w,k)})$$

where $P_i \in [0,1]^{H \times W \times K_u}$ is the softmax of the segmentation output $O_i = G(X_i) \in \mathbb{R}^{H \times W \times K_u}$, from a unified classifier. This loss may further be summed over all samples in each dataset, but this summation is omitted above for the sake of simplification.

Although unifying the label spaces across datasets enables cross-entropy optimization of $\mathcal{L}_{seg}^{ce}$, it can cause training difficulty when there is a label conflict across the datasets. Such conflicts can be commonplace in datasets that include similar data and that are used for similar purposes. The unified label space of $\mathbb{Y}_u$ may therefore include multiple distinct categories for the same type of object. Following the example above, three datasets may variously label a person riding a bicycle as, "rider," "cyclist," and "bicyclist." Label conflict may cause difficulty in optimizing the cross-entropy loss, because the softmax function may be dependent on the outputs of all classes.

To resolve this issue, the binary cross-entropy loss does not need a softmax operation with a value that is dependent on the outputs for other classes. Instead, binary cross-entropy loss may be accompanied by a sigmoid activation on the outputs, which may be independently applied to each class. Furthermore, labels may be selectively assigned to each class. Thus, a "null" class strategy may be used, where only valid labels are assigned for each dataset. In other words, for images from a dataset $D_i$, only labels for categories within $\mathbb{Y}_i$ may be assigned, while for other categories $\mathbb{Y} = \mathbb{Y}_u \setminus \mathbb{Y}_i$ neither a zero nor one may be assigned. This null binary cross-entropy loss can be expressed as:

$$\mathcal{L}_{seg}^{bce} = -\sum_{i=1}^{N} \sum_{k=1}^{K_i} \sum_{h,w} Y_i^{h,w,k} \log(Q_i^{(h,w,k)}) + (1 - Y_i^{h,w,k}) \log(1 - Q_i^{(h,w,k)})$$

where $Q_i \in [0,1]^{H \times W \times K_u}$ is the output from the sigmoid activation that represents the independent probability of each class. Although there is only a small difference from $\mathcal{L}_{seg}^{ce}$ in the summation, being summed over class $K_i$, this change makes a difference in the gradient updates, resolving the conflicts that may arise from conflicting labels, as no loss is calculated for a class k given the input image $X_2$.

The null binary cross-entropy loss ignores classes that are not within the label space of a given sample. However, inter-class relationships may further be leveraged to further improve performance. For a class c from dataset $D_i$, a new multiclass label $\tilde{Y}_{i,c} \in \{0,1\}^{K_u}$. This trains the classifier to predict not only the original class, but also the co-existing class from the unified label space $\mathbb{Y}_u$ when they are semantically related to one another. For example, observing that multi-class labels are mostly generated for subset/superset relationships (e.g., "bicyclist" to "rider" or "lane marking" to "road") instead of being related to classes with similar appearance or high co-occurrence.

Class relationships may therefore be used to govern similarity, and an additional label $c' \in \mathbb{Y}_u$ may be assigned if the similarity to a class $c \in \mathbb{Y}_i$ is above a threshold value:

$$\tilde{Y}_{i,c}^{c'} = \begin{cases} 1 & \text{if } c' = c \text{ or } s_{i,c}^{c'} > \max(\tau, s_{i,c}^{c}) \\ 0 & \text{else} \end{cases}$$

where $s_{i,c}^{c'}$ is the similarity between class c and class c', measured in dataset $D_i$, and $\tau$ is a threshold. When the classes c and c' have a conflict, the similarity may be large. In contrast, the similarity may be small for classes without a conflict.

For selecting the threshold $\tau$, if the largest score in $s_{i,c}$ comes from another dataset $D_j$, this indicates that a label conflict is likely and that multi-class labels are needed. The largest scores may be averaged to use as a threshold value. The maximum condition in $\tilde{Y}_{i,c}^{c'}$ also makes label generation more robust to variations in $\tau$, which implies that multi-labels need only be used when similarity for a class $c' \in \mathbb{Y}_u \setminus \mathbb{Y}_i$ is higher than that of the original class, e.g., $s_{i,c}^{c'} \geq s_{i,c}^{c}$.

To extract inter-class relationships, a cosine classifier may be used, where the cosine similarity between a feature and any classifier weight vector can be calculated, even for label spaces across datasets. The mean activation vector of a final output layer may be calculated, $s_{i,c} \in [0,1]^{K_u}$, which indicates the relationships between each class c in dataset $D_i$ and all other classes in the unified label space $\mathbb{Y}_u$:

$$s_{i,c}^{c'} = \frac{1}{M_{i,c}} \sum_{X_i \in D_i} \sum_{h,w} S_i^{h,w,c'} \cdot 1_{i,c}^{h,w}; \forall i \in \{1, \ldots, N\}; \forall c' \in \mathbb{Y}_u$$

where $S_i^{h,w,c'}$ is the cosine similarity between the image feature from dataset $D_i$ and the weight of class c', and $1_{i,c}^{h,w} \in \{0,1\}$ is an indicator whose value is 1 if the ground-truth is c at location (h, w) of $X_i$. The term $M_{i,c}$ denotes a number of pixels with the ground-truth value of c in $D_i$, and $X_i$ represents the samples in $D_i$. The term $s_{i,c}$ may be pre-computed for each dataset, since individual datasets would need different class relationships. Similarity between classes may be defined in an asymmetric manner, such that $s_{i,c}^{c'} \neq s_{j,c'}^{c}$ where $i \neq j$ and $c' \in \mathbb{Y}_j$, to address asymmetric relationships such as subsets and supersets. In addition, similarity may capture synonym relationships.

With the multi-class label $\tilde{Y}_{i,c}$ that is aware of the class-relationships across datasets, the class relational binary cross-entropy loss may be expressed as:

$$\mathcal{L}_{seg}^{cl-bce} = -\sum_{i=1}^{N}\sum_{k=1}^{K_i^c}\sum_{h,w} \tilde{Y}_{i,c}^{h,w,k}\log(Q_i^{(h,w,k)}) + (1 - \tilde{Y}_{i,c}^{h,w,k})\log(1 - Q_i^{(h,w,k)})$$

where the summation is performed over the $K_i^c$-categorical multi-label $\tilde{Y}_{i,c}$. As noted above, the multi-label $\tilde{Y}_{i,c}$ reflects labels that have an above-threshold degree of similarity to one another. As a result, the null categories can still be activated based on inferred class relationships.

Using the example described above, where "rider" is a superset of "cyclist," "bicyclist," and "motorcyclist," any of these classifications would be considered examples of a "rider" class, while the opposite is not necessarily true. These relationships may be implicitly captured, where the model can generate stronger "rider" activations when applying to the "cyclist" class, without generating strong activations for "cyclist" on "rider" classifications.

As noted above, given N datasets, $D=\{D_1, \ldots, D_N\}$, the label space may be unified as the union of the N individual label spaces, $\mathbb{Y}_u = \mathbb{Y}_1 \cup \mathbb{Y}_2 \cup \ldots \cup \mathbb{Y}_N$. The N datasets may themselves be combined using a concatenation of the individual datasets, producing a single unified dataset $D_u$. Each dataset $D_i$ may be pre-processed so that the segmentation labels can be remapped to a corresponding index of $\mathbb{Y}_u$. To make the training batches consistent, the images in the datasets may be re-sized to a shorter side as, e.g., 1080P, using 713×713 random cropping with data augmentations, such as scaling and random horizontal flipping.

The cosine classifier may be implemented in the final classification layer of a segmentation model, using $\ell_2$-normalization of both the 1×1 convolution weights and extracted features across the channel dimension. Letting $\hat{\phi}_c$ denote the $\ell_2$-normalized 1×1 convolution weight vector for the $c^{th}$ class, and letting $\hat{x}^{h,w}$ denote the $\ell_2$-normalized input feature vector at location (h, w), the cosine similarity for class c at location (h, w) may be calculated as:

$$S^{h,w,c} = t \cdot \hat{\phi}_c^T \hat{x}^{h,w} = t \cdot \|\phi_c\| \|x^{h,w}\| \cos\theta_c$$

where $\theta_c$ represents the angle between $\phi_c$ and $x^{h,w}$, and t is a scaling factor.

Figure 2:
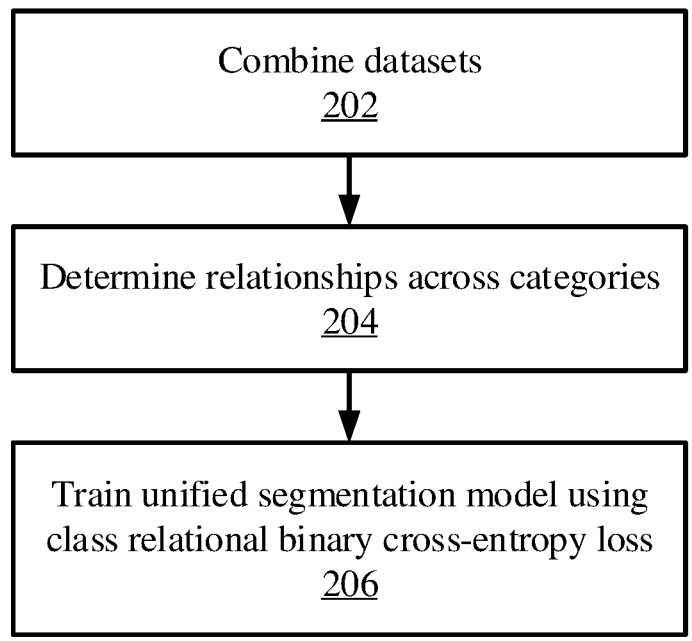
FIG. 2 is a block/flow diagram of a method of training a unified segmentation model using multiple datasets, in accordance with an embodiment of the present invention.

Referring now to FIG. 2, a method of training a segmentation model is shown. As will be described in greater detail below, the segmentation model may be implemented as a neural network, particularly in the form of a convolutional neural network for the processing of images. A unified training dataset can be formed for training the segmentation model by combining all of the data elements into a single dataset, for example by collecting all of the images of each of the training datasets.

Block 204 determines relationships across the different label categories in the unified label set $\mathbb{Y}_u$. As described in greater detail above, this can generate similarities $s_{i,c}^{c'}$ between a first class c and a second class c'. These similarities may be used in block 206, along with the combined dataset, to train the segmentation model using the class relational binary cross-entropy loss.

Figure 3:
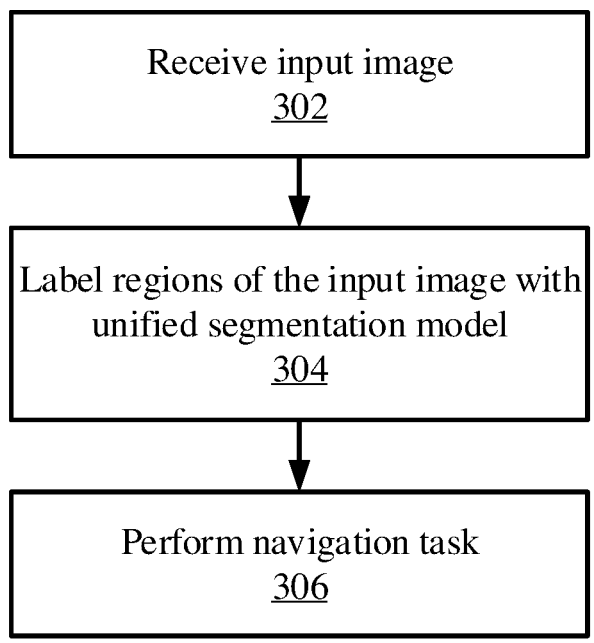
FIG. 3 is a block/flow diagram of a method of navigating a scene using a unified segmentation model that is trained on multiple datasets, in accordance with an embodiment of the present invention.

Referring now to FIG. 3, a navigation method is shown using a unified segmentation model. At block 302, a new input image is received from, e.g., a video capture device or digital camera. The image may be of, for example, a road scene, and may include a variety of objects. A non-limiting list of such objects may include road markers, sidewalks, barriers, buildings, traffic control devices, signs, traffic lights, pedestrians, animals, and vehicles, where vehicles may be any type of manned or unmanned conveyance.

Block 304 uses the trained unified segmentation model to identify objects within the input image. For example, the model may provide a pixel-by-pixel labels for every part of the image, with pixels having similar labels being grouped together into regions. Further processing may be performed on the image, such as depth processing and motion detection, to provide a representation of a three-dimensional scene that is depicted in the input image. Block 306 then uses this information to perform a navigation task.

Figure 4:
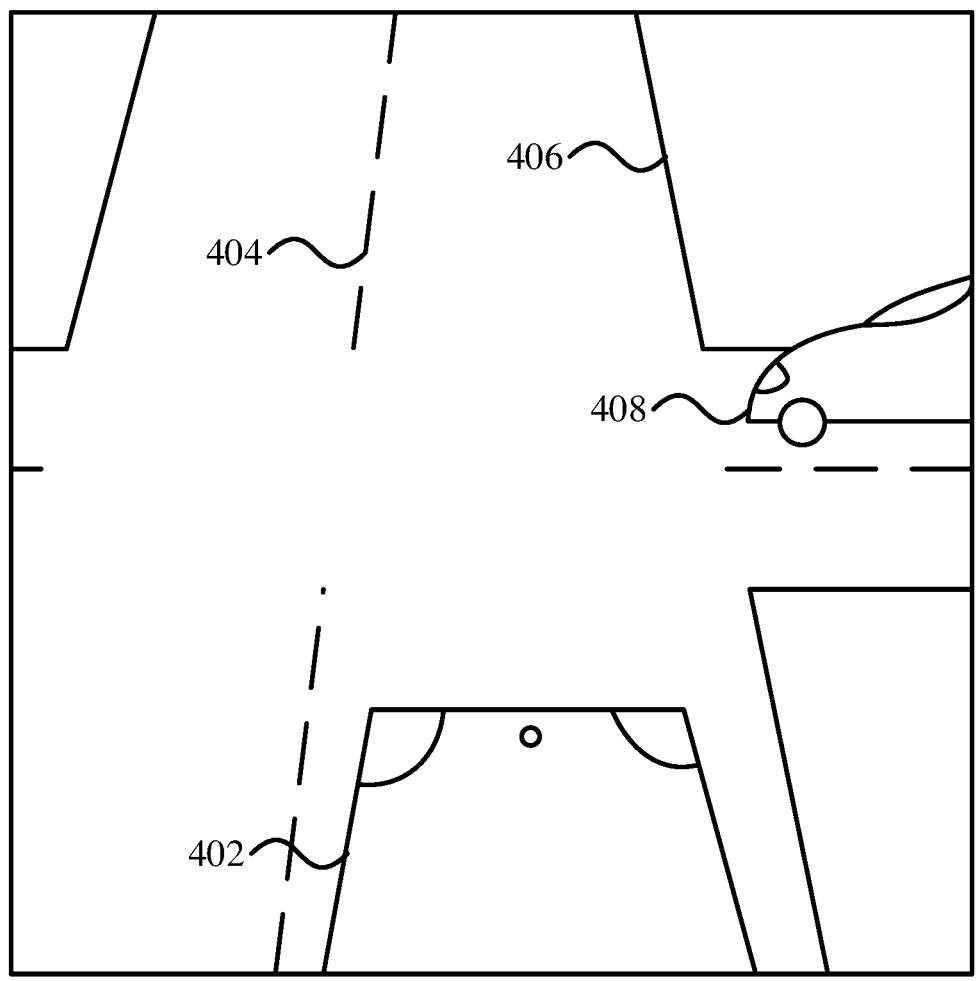
FIG. 4 is a diagram of a scene that may be used as input to a unified segmentation model, illustrating navigation through a scene, in accordance with an embodiment of the present invention.

Referring now to FIG. 4, an example input image is shown. The input image may be taken by a camera that is mounted on a vehicle 402, and may show the surroundings of the vehicle 402 from a particular perspective. It should be understood that multiple such images may be used to show various perspectives, to ensure awareness of the vehicle's entire surroundings. In some cases, a panoramic or 360° camera may be used.

The unified segmentation model processes the input image, and identifies different objects that are shown in the scene. For example, the unified segmentation model may detect environmental features, such as the road boundary 406 and lane markings 404, as well as moving objects, such as other vehicles 408. Using this information, a navigation or self-driving system in the vehicle 402 can safely navigate through the scene. By using a unified segmentation model, which is trained using multiple datasets, the ability of the system to identify and distinguish between different objects is enhanced.

Figure 5:
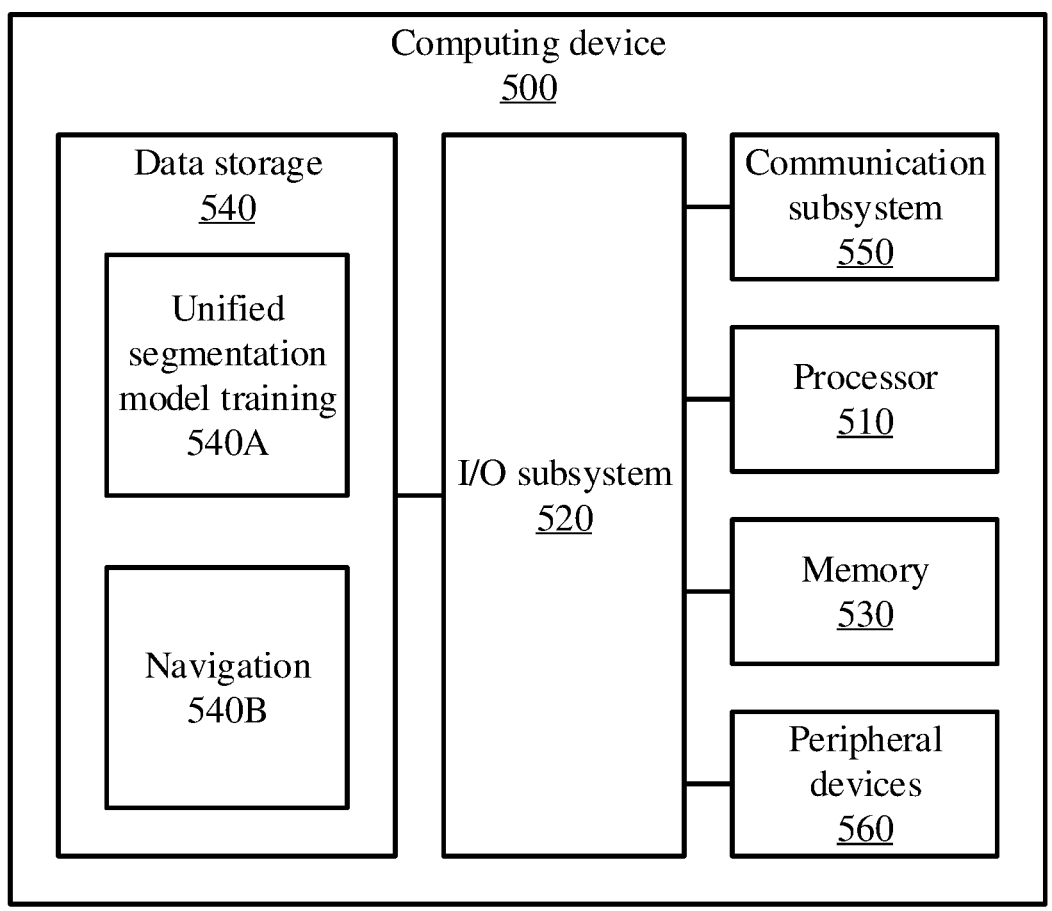
FIG. 5 is a block diagram of a computing device that can train a unified segmentation model and that can navigate through a scene, in accordance with an embodiment of the present invention.

FIG. 5 is a block diagram showing an exemplary computing device 500, in accordance with an embodiment of the present invention. The computing device 500 is configured to identify a top-down parametric representation of an indoor scene and provide navigation through the scene.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s)

(CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for training a unified segmentation model and program code 540B for navigating through a scene. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

These and other variations of a hardware processor subsystem are also contemplated in accordance with embodiments of the present invention.

Figure 6:
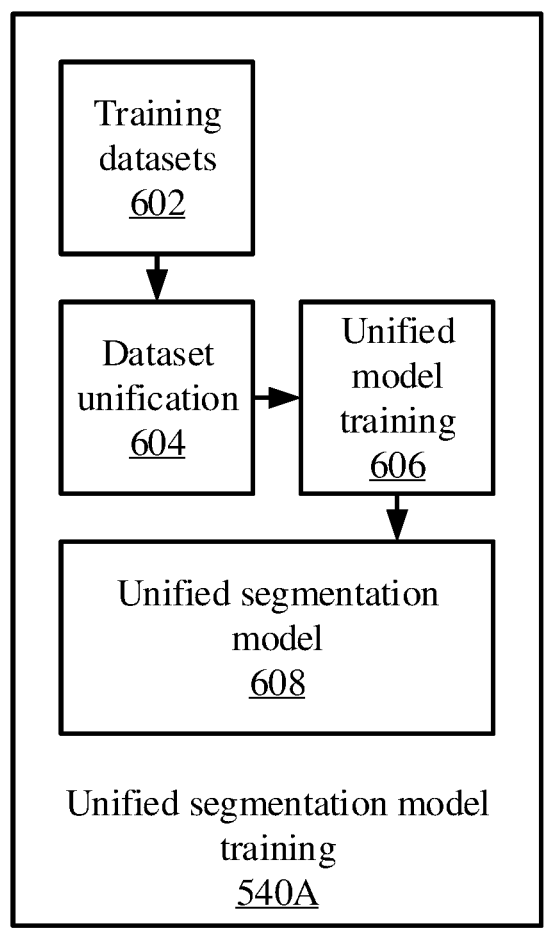
FIG. 6 is a block diagram of a computer program product for training a unified segmentation model, in accordance with an embodiment of the present invention.

Referring now to FIG. 6, additional detail on the unified segmentation model training 540A is shown. The training datasets 602 may be stored in memory 530 and may include training data that is labeled according to different label spaces. Block 604 unifies the datasets, which may include combining the training data as well as unifying the label spaces for the different respective datasets. Unified model training 606 may use the unified dataset as training data, with a loss function that takes into account relationships between the labels of the different datasets. The output is a unified segmentation model 608.

The segmentation model may be implemented as a neural network architecture. In particular, it is contemplated that the segmentation may include at least one convolutional neural network (CNN) layer. CNNs process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

Figure 7:
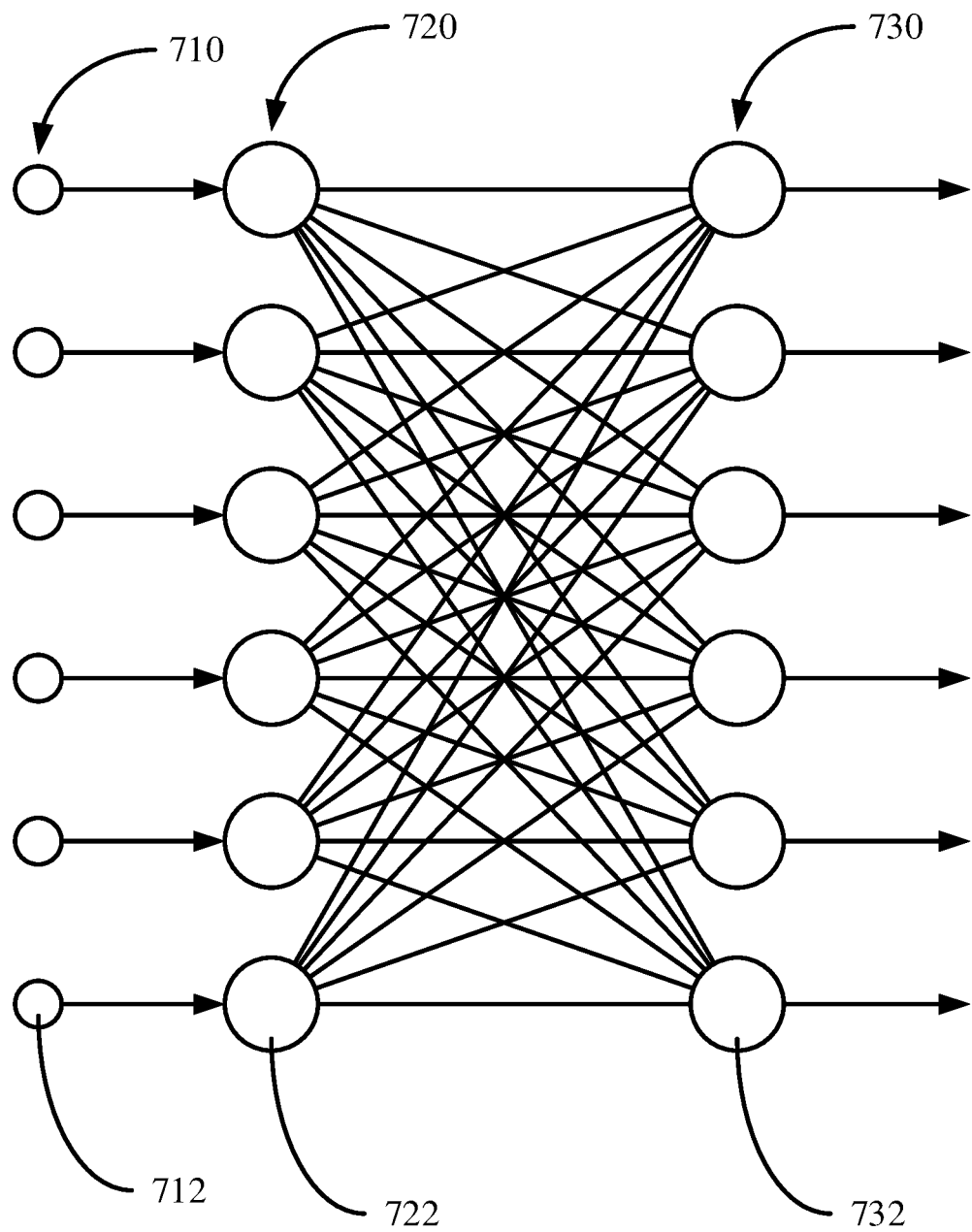
FIG. 7 is a diagram of a neural network architecture, in accordance with an embodiment of the present invention.

Referring now to FIG. 7, an exemplary neural network architecture is shown. In layered neural networks, nodes are arranged in the form of layers. A simple neural network has an input layer 720 of source nodes 722, a single computation layer 730 having one or more computation nodes 732 that also act as output nodes, where there is a single node 732 for each possible category into which the input example could be classified. An input layer 720 can have a number of source nodes 722 equal to the number of data values 712 in the input data 710. The data values 712 in the input data 710 can be represented as a column vector. Each computational node 730 in the computation layer generates a linear combination of weighted values from the input data 710 fed into input nodes 720, and applies a non-linear activation function that is differentiable to the sum. The simple neural network can perform classification on linearly separable examples (e.g., patterns).

Figure 8:
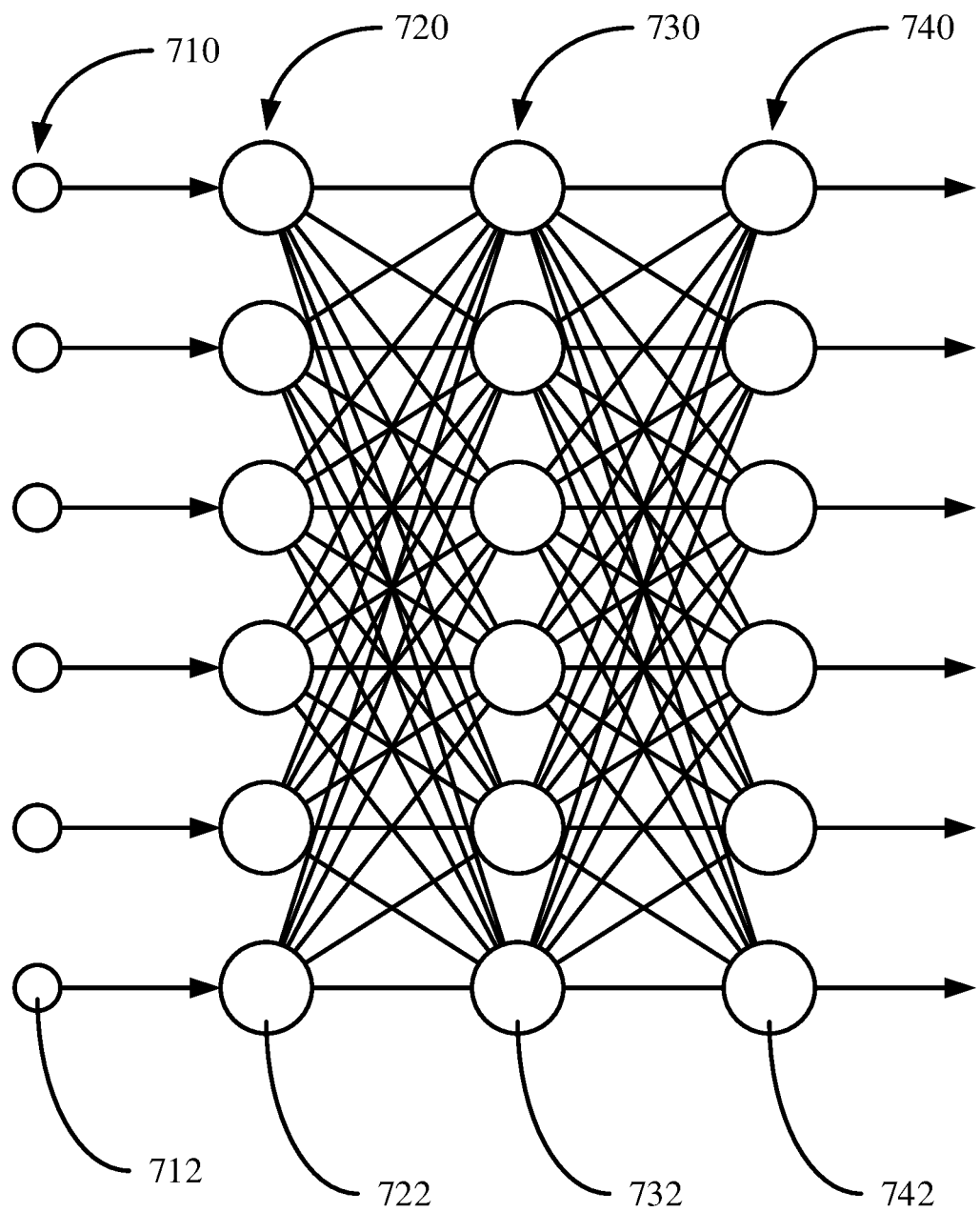
FIG. 8 is a diagram of a deep neural network architecture, in accordance with an embodiment of the present invention.

Referring now to FIG. 8, a deep neural network architecture is shown. A deep neural network, also referred to as a multilayer perceptron, has an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers because they are between the source nodes 722 and output node(s) 742 and not directly observed. Each node 732, 742 in a computation layer generates a linear combination of weighted values from the values output from the nodes in a previous layer, and applies a non-linear activation function that is differentiable to the sum. The weights applied to the value from each previous node can be denoted, for example, by $w_1$, $w_2$, $w_{n-1}$ $w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 732 in the one or more computation (hidden) layer(s) 730 perform a nonlinear transformation on the input data 712 that generates a feature space. The feature space the classes or categories may be more easily separated than in the original data space.

The neural network architectures of FIGS. 7 and 8 may be used to implement, for example, any of the models shown in FIG. 2. To train a neural network, training data can be divided into a training set and a testing set. The training data includes pairs of an input and a known output. During training, the inputs of the training set are fed into the neural network using feed-forward propagation. After each input, the output of the neural network is compared to the respective known output. Discrepancies between the output of the neural network and the known output that is associated with that particular input are used to generate an error value, which may be backpropagated through the neural network, after which the weight values of the neural network may be updated. This process continues until the pairs in the training set are exhausted.

After the training has been completed, the neural network may be tested against the testing set, to ensure that the training has not resulted in overfitting. If the neural network can generalize to new inputs, beyond those which it was already trained on, then it is ready for use. If the neural network does not accurately reproduce the known outputs of the testing set, then additional training data may be needed, or hyperparameters of the neural network may need to be adjusted.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a model, comprising:
    combining data from multiple datasets, the datasets having different respective label spaces;
    identifying relationships between labels in the different label spaces, including determining a cosine similarity between an image feature and a weight of a label class; and
    training a unified neural network model, using the combined data and the identified relationships to generate a unified model, with a class relational binary cross-entropy loss.

2. The computer-implemented method of claim 1, wherein the unified neural network model is an image segmentation model.

3. The computer-implemented method of claim 2, wherein the multiple datasets include images, with the different respective label spaces relating to different classes of objects within the images.

4. The computer-implemented method of claim 3, wherein the different label spaces include at least two labels that overlap in objects that they apply to.

5. The computer-implemented method of claim 1, further comprising:
    capturing a new image of a scene;
    performing image segmentation using the unified neural network model to identify objects within the scene; and
    navigating through the scene to avoid collision with the identified objects.

6. The computer-implemented method of claim 1, wherein the relationships include synonym relationships and hierarchical relationships.

7. The computer-implemented method of claim 1, wherein the class relational binary cross-entropy loss is determined as:

$$\mathcal{L}_{seg}^{cl-bce} = -\sum_{i=1}^{N} \sum_{k=1}^{K_i^c} \sum_{h,w} \tilde{Y}_{i,c}^{h,w,k} \log(Q_i^{(h,w,k)}) + (1 - \tilde{Y}_{i,c}^{h,w,k})\log(1 - Q_i^{(h,w,k)})$$

where N is a number of the multiple datasets, $K_i^c$ is a number of labels having identified relationships to a label c, h and w are coordinates within an image, $\tilde{Y}_{i,c}^{h,w,k}$ is a multi-class label for a pixel, and $Q_i^{(h,w,k)}$ represents an independent probability of each class.

8. The computer-implemented method of claim 1, wherein identifying the relationships between labels includes determining that a first label having a similarity score to a second label that exceeds a threshold is related to the second label.

9. The computer-implemented method of claim 1, combining data from multiple datasets includes concatenating the multiple datasets in a single unified dataset.

10. A computer-implemented method for training a model, comprising:
    combining data from multiple datasets of images, the datasets having different respective label spaces that relate to different classes of objects within the images;
    identifying relationships between labels in the different label spaces, including hierarchical and synonym relationships, based on a cosine similarity between an image feature and a weight of a label class; and
    training a unified image segmentation neural network model, using the combined data and the identified relationships to generate a unified model, with a class relational binary cross-entropy loss.

11. A system for training a model, comprising:
    a hardware processor; and
    a memory that stores a computer program product, which, when executed by the hardware processor, causes the hardware processor to:
        combine data from multiple datasets, the datasets having different respective label spaces;
        identify relationships between labels in the different label spaces, including a determination of a cosine similarity between an image feature and a weight of a label class; and
        train a unified neural network model, using the combined data and the identified relationships to generate a unified model, with a class relational binary cross-entropy loss.

12. The system of claim 11, wherein the unified neural network model is an image segmentation model.

13. The system of claim 12, wherein the multiple datasets include images, with the different respective label spaces relating to different classes of objects within the images.

14. The system of claim 13, wherein the different label spaces include at least two labels that overlap in objects that they apply to.

15. The system of claim 11, wherein the relationships include synonym relationships and hierarchical relationships.

16. The system of claim 11, wherein the class relational binary cross-entropy loss is determined as:

$$\mathcal{L}_{seg}^{cl-bce} = -\sum_{i=1}^{N}\sum_{k=1}^{K_i^c}\sum_{h,w} \tilde{Y}_{i,c}^{h,w,k}\log(Q_i^{(h,w,k)}) + (1 - \tilde{Y}_{i,c}^{h,w,k})\log(1 - Q_i^{(h,w,k)})$$

where N is a number of the multiple datasets, $K_i^c$ is a number of labels having identified relationships to a label c, h and w are coordinates within an image, $\tilde{Y}_{i,c}^{h,w,k}$ is a multi-class label for a pixel, and $Q_i^{(h,w,k)}$ represents an independent probability of each class.

17. The system of claim 11, wherein the computer program product further causes the hardware processor to determine that a first label having a similarity score to a second label that exceeds a threshold is related to the second label.

18. The system of claim 11, wherein the computer program product further causes the hardware processor to concatenate the multiple datasets in a single unified dataset.

* * * * *